United States Patent Office 2,708,633
Patented May 17, 1955

2,708,633

HIGH PROTEIN DEIONIZED MILK AND PROCESS OF MAKING THE SAME

Edwin G. Stimpson, Sayville, and Lloyd K. Riggs, Oakdale, N. Y., assignors to National Dairy Research Laboratories, Inc., Oakdale, N. Y., a corporation of Delaware No Drawing. Application July 14, 1951,
Serial No. 236,853

37 Claims. (Cl. 99—54)

This invention relates to a process for manufacturing a milk product having special dietary characteristics and to the product thereby obtained, and, more particularly, to a process for manufacturing a milk product having a high protein content, a negligible sodium content and controlled nonsodium ash content, while retaining good palatability, and to the product obtainable by this process having these characteristics.

In the treatment of hypertension, nephrosis, high blood pressure, and during pre- and postoperative care, a low sodium diet has been increasingly recommended.

It is desirable in these diets to supply a high protein content of good quality with a minimum of carbohydrate, fat and other purely energy nutritional constituents, but these diets are difficult to maintain because nearly all natural sources of protein contain considerable quantities of sodium.

Accordingly, it is an object of this invention to provide a product which will supply high quality protein to the diet of patients who must restrict or eliminate sodium intake.

It is also an object of the invention to provide a product which can be supplemented with any desired ratio of edible salts so that the flavor may be improved and/or the calcium-to-phosphate ratio maintained within satisfactory limits and/or the potassium-to-protein ratio maintained within a range satisfactory for good metabolism, or such other salt adjustments made as may be desirable.

It is another object of the invention to provide a process for incorporating protein in milks and in concentrated milks, and then treating the milks with a mixed bed of cation and anion exchange resins in order to produce a deionized milk product whose sodium and chloride content is less than 5% that of natural milk, but whose protein content is considerably higher than that of natural milk.

It is a further object of the invention to provide milk products whose protein contents are higher than that of natural milk, whose carbohydrate contents are substantially equivalent to that of natural milk and which contain sodium, potassium, calcium, phosphate, sulfate and chloride ions in any desired proportions.

It is another object of the invention to produce a milk powder substantially free of sodium and high in milk protein.

It is also an object of the invention to prepare deionized milk products substantially equivalent to natural milk in character and appearance but whose ash contents are less than 45% of the ash content of natural milk and whose protein contents are more than 30% higher than the protein content of natural milk.

To accomplish these objects, milk is deionized in accordance with the invention by treating it with a mixture comprising one part of an anion exchange resin and from 0.8 to 1.33 parts of a cation exchange resin, said parts being determined on an ion exchange capacity basis, the proportions of said resins being selected in the stated ranges to maintain the pH of the effluent milk at within the range from 5.8 to 7.0. The protein content is increased to the desired high level in accordance with the invention by incorporating protein therein.

During deionization with the mixture of ion exchange resins, the milk undergoes no appreciable reduction in protein and carbohydrate content, but its ion (ash) content is reduced by as much as 80%. Upon the addition of protein, the protein content is increased and the total solids content likewise is increased, while the ash and carbohydrate contents are unchanged.

The finished product may be used per se, or it may be treated in various ways, as for example, concentrated or dried by a suitable process to produce a reconstitutable deionized high protein milk powder product. The concentrate or powdered product may be mixed with water or other liquids and served as a beverage, or used in foods.

The invention is particularly applicable to the deionization of cow's milk, but can also be used, with slight change, for the deionization of goat's milk, mare's milk, ewe's milk, etc.

It is convenient to regard the process of the invention by which these objects are accomplished as comprising two operations; (1) the deionizing of milk (2) the incorporation of protein in the milk. The ensuing discussion will give further details of the process of the invention under these headings.

It will be understood that these operations may be carried out in either order, the milk being deionized first or the protein being added first, the sequence being dependent upon several considerations which will be apparent from the following discussion. For example, the milk may first be deionized and then, after adjustment of pH and solids content, the protein may be added thereto, or the protein may be first incorporated in the milk, which is then deionized.

Also, the operations may be combined with or in addition to other operations, such as concentration, homogenization and pasteurization.

DEIONIZATION OF THE MILK

It is important in understanding the deionization step of the invention to distinguish between ion exchange, broadly, and deionization. Ion exchange processes involve the replacement of one ion by another through the action of an adsorbent material which possesses a stronger affinity for some cations and anions than for others. The substitution of sodium ion for calcium ion in water softening is an example of ion exchange. In deionization, however, which involves ion exchange but is usually differentiated therefrom because of the important difference in result, hydrogen and hydroxyl ions are substituted for cations and anions, respectively. Thus in deionization salt-forming cations and anions are completely removed. In all other ion exchange processes, one salt-forming anion or cation is merely substituted for another. Whereas in deionization dissolved salts are completely removed from solution in other ion exchange processes one salt is merely replaced by another.

In the deionization step of the present invention, salt cations and anions present in milk are replaced by hydrogen and hydroxyl ions, respectively.

It is also important to distinguish conventional and reverse deionization processes from the mixed bed deionization process employed in the invention. In conventional deionization processes the material to be deionized is passed first into contact with a cation exchange resin, whereby cations are replaced by hydrogen ion, and then into contact with an anion exchange resin, whereby anions are replaced by hydroxyl ion. In reverse deionization processes, the anions are first replaced by hydroxyl ion by contact with an anion exchange resin and then subsequently the cations are replaced by hydrogen ion through contact with a cation exchange resin.

In the process of the present invention, employing a mixed bed of cation and anion exchange resins, substitution of hydrogen and hydroxyl ions for cations and anions takes place simultaneously.

Anion exchange resins of any basicity can be employed in the process of the invention. Synthetic resins having anion exchange properties are now well known to those skilled in the art and can be prepared in various ways.

In general, it may be said that, chemically, anion exchange resins are of a highly polymerized structure, carrying a number of amino, quaternary ammonium, or like basic groups, as exemplified by melamine-formaldehyde-guanidine resins, phenol-formaldehyde-poly-amine resins, and acetone-formaldehyde-polyamine resins. A number of these resins are described in Ion Exchange Resins by Robert Kunin and Robert J. Myers, published by John Wiley & Sons, New York (1950), at pages 57 to 60; the resins listed in the table at page 59 and in the description on these pages can be employed in the process of the invention. Other anion exchange resins which can be employed are described in Patents No. 2,341,907 to Harrold C. Cheetham and Robert J. Myers, dated February 15, 1944, and No. 2,546,938 to William C. Bauman and George B. Husted, dated March 27, 1951.

Although either weak or strongly basic anion exchange resins can be employed with equally good results, insofar as the removal of anions is concerned, it has been found that weak anion exchange resins tend to remove protein to a greater extent than the strongly basic resins, and therefore it is preferred to employ a strongly basic anion exchange resin.

A preferred class of strongly basic anion exchange resins is known to those skilled in the art as quaternary ammonium anion exchange resins. These contain a large plurality of available quaternary ammonium groups on the resin molecule, substituted on an aromatic isocyclic or heterocyclic ring or on an aliphatic chain which may itself be substituted on an aromatic ring, and are obtained by polymerization of an aromatic amine, and an aldehyde, such as formaldehyde, or a polyamine, a phenol and an aldehyde, such as formaldehyde, and then quaternizing the amino group in the resin, as shown, for example, in U. S. Patent No. 2,543,666 to Malden W. Michael, dated February 27, 1951. This class of resin may also be made by polymerizing a quaternary ammonium salt, a phenol and an aldehyde, or by polymerizing an aromatic benzene containing an ethylenic substituent and one or more quaternary ammonium groups. Commercially available quaternary ammonium anion exchange resins are sold under the trade names Amberlite IR-400 (available from the Rohm & Haas Company), Dowex 1, Dowex 2 and Nalcite SAR (all available from the Dow Chemical Company).

Typical anion exchange resins of lesser strength than the quaternary ammonium type resins but which also can be used in the process of the invention are Deacidite, Amberlite IR-45, Amberlite IR-4B, Duolite A2 and Wofolite M.

The cation exchange resin employed herein, in contrast to the anion exchange resin, must be strongly acidic. It has been found that in order to effectively remove sodium and potassium cations it must pass the following test for acidity: At least 10 cc. of a standard solution containing 0.0284 equivalent per liter of potassium dihydrogen acid phosphate and 0.0284 equivalent per liter of sodium hydroxide having a pH of 8.78 is passed through a volume of the mixed resin bed calculated to deionize the solution at 70 to 80° F. at a rate of flow of about 0.2 volume of solution per volume of resin per minute. A 10 cc. aliquot of this deionized solution shall require at least 10 cc. of a standardized 0.1 N sodium hydroxide solution to bring it to a phenolphthalein end point. The term "strongly acidic" is used in the specification and claims to refer to cation exchange resins which pass this test.

The nuclear sulfonic acid-type cation exchange resins are sufficiently acidic to pass this test. These resins are likewise well known to those skilled in the art and contain a large plurality of sulfonic acid groups in the resin molecule substituted on an aromatic isocyclic or heterocyclic ring or on an aliphatic chain which may itself be substituted on an aromatic ring. These resins are prepared by interaction of an aldehyde, a phenol and a sulfuric acid or sulfite, or by sulfonating a resin having an aromatic ring in the molecule, such as tannin-aldehyde and phenol-aldehyde resins. Typical resins of this class are described in Patent No. 2,204,539 to Hans Wassenegger and Karl Jaeger, dated June 11, 1940, No. 2,366,007 to Gaetano F. D'Alelio, dated December 26, 1944, and No. 2,372,233 to Jack T. Thurston, dated March 27, 1945. Nuclear sulfonic acid type resins available commercially which meet the test conditions set forth are Amberlite IR-120 (available from the Rohm & Haas Company), Dowex 50 (the resin set forth in Patent No. 2,366,007 and available commercially from the Dow Chemical Company) and Nalcite HCR (available from the Dow Chemical Company).

Strongly acidic carboxylic acid type cation exchange resins, such as chloroacetic acid-containing resins, also are satisfactory.

Permutit 216, Alkalex and Wofolite C are too weak to pass the test described.

It will be apparent from the above that mixtures of a strong acidic cation exchange resin with either a strong basic or weakly basic anion exchange resin are operative in the deionization step of the invention, while mixtures of a weakly acidic cation exchange resin with either a strongly basic or weakly basic anion exchange resin cannot be used.

Present knowledge indicates that the proportions of the cation and anion exchange resins in the mixed bed are critical. The resins must be present on an essentially equivalent ion exchange capacity basis.

For purposes of estimating the proportions required for a given ion exchange resin, the ion exchange capacity of the moist resin is determined as follows: The freshly regenerated active ion exchange resin is rinsed and drained. Two samples of exactly 2 grams each are weighed out and placed in 150 cc. beakers. If the resin is an anion exchange resin, 25 cc. of 0.1 normal HCl are run into each beaker. If the resin is a cation exchange resin, 60 cc. of 0.1 normal NaOH are added instead. The samples are allowed to stand for 15 minutes with occasional stirring and then filtered rapidly through a stainless steel screen. The resin particles on the screen are washed with water and the filtrates back-titrated using phenolphthalein. The moist resin capacity is then calculated as follows:

1. Number of cc. of 0.1 N solution originally mixed with resin
   Minus number of cc. of 0.1 N solution required for back titration
   Equals number of cc. of 0.1 N solution neutralized by resin
2. The above value is averaged for the two samples
3. $\dfrac{\text{Average number of cc. 0.1 N solution neutralized by resin}}{2 \ (\text{Number of grams of resin used}) \times 10}$ Equals $\dfrac{\text{Number of cc. 1.0 N solution neutralized}}{(\text{Number of grams moist resin})}$ Since each cc. of a 1.0 N solution contains one milliequivalent weight this last equation also expresses the milliequivalent ion exchange capacity per gram of wet resin.

On an ion exchange capacity basis, from 0.8 to 1.33 parts of cation exchange resin may be employed for each part of anion exchange resin. Usually a larger amount of anion exchange resin is employed because most cation exchange resins have a higher ion exchange capacity. For maximum efficiency, a mixed bed of Amberlite IR-400 and Amberlite IR-120 will contain from 60 to 70% of the former and from 40 to 30% of the latter.

It will be understood that these proportions apply only if the resin is fully regenerated. If the resin is not fully regenerated, an equivalent ion exchange capacity weight of the resin used is determined, and the mixed bed made up on the basis of this determination. In general, the most acceptable resin ratio is one where each resin is present at an approximately equivalent ion exchange capacity.

Natural whole and skim milk and also concentrated whole and skim milk of any desired solids content can be deionized, as well as milk to which protein has been added before deionizing. Preferably, whole milk is homogenized before being deionized. The milk can be pasteurized before deionization, if desired.

Milk of the higher solids contents may give rise to mechanical difficulties in running through the column of resin. The higher the solids content, the more slowly the milk tends to flow through the column, and at solids contents above about 30% ordinarily the rate of flow will be too slow to be practical in a commercial operation. Thus milks whose solids contents are not above about 20% can be deionized more readily. If a slow rate is not a disadvantage, however, milk of a solids content up to approximately 30% can be deionized by the process of the invention.

It has been found that a higher yield of solids, based on the weight of solids put through, is obtained when a milk of high solids content is deionized than when natural whole or skim milk is deionized. This effect is most noticeable in a concentrated skim milk. It is thought that this occurs because, the milk being more concentrated, the degree of ionization of calcium salts is decreased. The potassium and sodium salts remain more or less fully ionized and therefore a higher proportion of sodium and potassium salts, relative to the calcium salts, can be absorbed on the resin.

It has been determined that the deionization should be carried out at a temperature above 60° F. for most efficient operation. At lower temperatures, the viscosity of the milk is such that its flow through the bed is very slow and the deionization is appreciably lengthened. At temperatures above 60° F. the flow is fast enough to make operation independent of viscosity. The effect of temperature on resin ion exchange capacity is negligible, but some resins may require a maximum temperature of the order of 100° F. depending upon their chemical nature.

The rate of flow should be about 0.5 gal./min./cu. ft. of resin for maximum efficiency, at temperatures in the range of 75 to 80° F. The rate of flow will depend to a certain extent upon the resin used and its ion exchange capacity. At each temperature, there is an optimum flow rate, this optimum increasing with temperature.

The pH of the effluent milk will range from 5.8 to 6.5 when the mixed bed contains resins in the stated proportions. If the resin ratio is changed, a higher pH may be obtained, but at a pH of above 7 a loss in efficiency results. At a pH below about 5.0 milk protein will coagulate. Consequently, the resin proportions should be selected so as to maintain the pH of the effluent milk at within the range from 5.0 to 7.0, preferably 5.8 to 6.5. If the milk being deionized contains added protein, in accordance with the invention, the preferred pH range is from 5.8 to 6.2.

During the first portion of any run, analysis of the effluent milk shows that the sodium, potassium, chloride and sulfate ions are up to 99.5% removed, while the calcium is present in the effluent milk at a level of 50 to 55% of normal, and the phosphate at a slightly higher level. The remaining calcium and phosphate ions as well as sodium, potassium, sulfate, and chloride ions are thought to be bound in some way to the protein, so that they are not available for ion exchange.

As the ion exchange capacity of the resins becomes exhausted, the level of cations and anions in the effluent milk slowly rises. Inasmuch as the process is designed to deionize milk, use of a given mixed bed is continued only so long as hydrogen and hydroxyl ions are being exchanged for anions and cations. When this point has been passed, influent milk will undergo ion exchange with ions previously adsorbed, and effluent milk will be high in sodium, although remaining low in other cations.

For this reason, the ion exchange capacity of the mixed resin bed is followed by measuring the electrical conductivity of the effluent milk: while the ion exchange capacity is high, the conductivity is low, but as the sodium content rises, electrical conductivity also rises. When the conductivity has reached a value indicating that deionization has stopped and an exchange of sodium for other cations has begun, flow of milk through the bed is halted and the bed is regenerated.

In order to regenerate the resins, it is first necessary to separate the anion exchange resin from the cation exchange resin. This can be done by taking advantage of the difference in density of the resins. They may be separated, for example, by plunging the bed into sodium hydroxide solution, such as spent caustic solution from a previous regeneration, with air agitation. The less dense resin (usually the anion exchange resin) will be suspended in the caustic and can be drawn off at the top thereof, leaving the denser resin (usually the cation exchange resin) below. After the resins have been separated, the anion exchange resin is regenerated with sodium hydroxide solution of any desired concentration, preferably 2 to 10%, and thoroughly rinsed with several portions of water, while the cation exchange resin is regenerated with 2 to 5% sulfuric acid solution and rinsed with several portions of water. Thereafter the resins are again combined and thoroughly mixed by suspending them in water with air agitation. The column can then be employed to deionize a second batch of milk.

For example, when the mixed bed is composed of Amberlite IR-400 and Amberlite IR-120 for each 100 parts of mixed wet resins, equal to approximately 150 parts in volume, 350 to 500 parts of milk may be deionized. This amount of resin will give a composite effluent with at least 74% of its ash content removed.

When milk of high solids content is deionized, it is desirable to rinse the column with water before regeneration.

INCORPORATION OF PROTEIN IN THE MILK

In this operation the protein content of the milk is increased to a total from 30% to 100% by weight, and preferably to at least 50% by weight.

The basic idea of this aspect of the invention is based on an appreciation of the fact that protein can be dispersed or dissolved uniformly and completely in milk in larger than normal quantities without the use of alkalis or other dispersing materials to produce a uniform dispersed fluid high protein product which can be dried to produce a soluble reconstitutable high protein deionized milk product.

The protein which can be introduced can be casein, which being a normal constituent of milk, naturally is a protein of choice. As is well known, the principal milk protein is casein, and lactalbumin and lactoglobulin may be coprecipitated with and therefore present in the casein available commercially. Other protein materials which behave like casein can be used. However, casein is the most available protein for the purpose of the invention, and its use therefore is illustrated in the examples.

Casein for use in the invention may be prepared from milk by any suitable process known to the art, such as by acid precipitation, either by the addition of mineral acid, or by the development of lactic acid through bacterial growth, or by rennet precipitation or by a combination of any of these. These methods are well known to those skilled in the art and the following brief description thereof will be sufficient.

In the manufacture of mineral acid-precipitated casein, dilute strong mineral acid, such as hydrochloric or sulfuric acid, is added to skim milk at 95° F. in sufficient quantity to bring the pH to 4.1 to 4.8.

Lactic acid-precipitated casein is prepared by inoculating the milk with lactic acid bacteria and allowing it to stand at a temperature favorable to bacteria growth until curdling takes place. Rennet casein is obtained by warming a fresh low fat skim milk to 96° F. and adding 4 ounces of rennet to each 100 gallons of milk. The curd has separated in 15 to 20 minutes, after which the curd is broken up and heated to 100 to 110° F. After settling, the curd is drained.

The curd obtained in the above procedures is washed, and then can be added to the milk. It is unnecessary to dry the casein, although this can be done if desired.

If the casein curd is coarse and hard, it can be prepared for dispersion in the milk by milling with water until the solids contents and particle size of the curd are substantially reduced.

The protein can be mixed with milk having the usual solids-not-fat content of about 8 to 9%, the mixing being done at room or an elevated temperature, and the mixture heated at a temperature within the range from 80 to 150° F. until the casein has been dispersed. This will require from 10 to 30 minutes. If the temperature is at 143° F. or above and the time is 30 minutes, or less at higher temperatures, the milk will also be pasteurized, and it is convenient thus to combine two operations. During the heating a chemical-physical reaction whose exact nature is not yet fully understood, occurs and the macroscopic protein particles become colloidally and uniformly dispersed in the milk, while the alkaline buffer capacity of the milk is consumed such that the pH of the milk is lowered from the normal value of 6.8 to a value in the range from 5.8 to 6.2, depending upon the actual quantity of protein being dispersed and its freedom from whey impurities.

The efficiency of the dispersing operation is increased if the solids content of the milk is increased appreciably, to from 10 to 35%. This can be done by concentrating the milk in vacuo or at a reduced pressure at a temperature in the range from 90 to 135° F. Temperatures above 135° F. can be used if the pH of the milk lies within the range from 6.6 to 6.8. Concentration also reduces the volume of the product that must be maintained under refrigeration, diminishes bacterial growth in the finished product and facilitates the preparation of a dry powder therefrom. However, it also increases the viscosity of the milk, and if the mixing is done in the cold, i. e., below about 100° F., relatively heavy mixing apparatus may therefore be needed. For this reason it is preferred to heat a concentrated milk to from 120 to 130° F. while mixing in the protein.

If the protein is dispersed in a deionized milk, particular attention must be paid to the pH of the milk during the mixing, to obtain a uniform dispersion and prevent a change in the character of the milk. During addition of the protein it is essential to maintain the pH at above 5.8. If the pH is allowed to fall below this, the protein will coagulate irreversibly during the heating necessary for dispersion and/or pasteurization.

Thus, the pH of the deionized milk should be adjusted to within the range from 5.8 to 6.2 by addition of alkali, such as aqueous potassium, calcium and ammonium hydroxide, and the protein is then added thereto in the desired amount. It is possible to incorporate from 20 to 60 parts of protein into from 80 to 40 parts of deionized milk, based on the milk solids, and obtain a product with satisfactory flavor characteristics.

TREATMENTS SUBSEQUENT TO DEIONIZATION AND INCORPORATION OF PROTEIN

It will have been noted that the milk can be pasteurized during any of the preceding operations. It is customary, regardless of these intermediate pasteurizations, to pasteurize the deionized high protein milk product. Pasteurization, at whatever stage of the process it is brought about, can be by either a flash or a holding method, and can be carried out at temperatures from 145° to 185° F., for from 10 seconds to 30 minutes. In pasteurizing the deionized high protein product, the pH must be carefully controlled in order to avoid coagulation of the protein, and should be within the range from 6.2 to 6.8. The pH can be brought to within the desired range by addition of aqueous potassium hydroxide, such as a 10% potassium hydroxide solution. In a deionized high protein product having a pH below 5.8, the protein will coagulate when the temperature approaches 140° F., but in a product having a pH of 6.2 or above, protein will not coagulate even at 185° F.

The deionized high protein milk may also be concentrated to a relatively high solids content, say up to 35%, if this has not already been done in preparation. Concentration preferably is carried out in vacuo or at a reduced pressure at a temperature in the range from 90 to 135° F. Temperatures above 135° F. can be used if the pH of the milk lies within the range from 6.2 to 6.8. However, the pH of the milk tends to drop during concentration, and it is desirable to have an initial pH of 6.6 to 6.8 to avoid a lowering of the pH to below 6.2 during concentration.

It is interesting to note that in the event the finished product is to be both concentrated and pasteurized, it is desirable to pasteurize the milk before rather than after concentration. A condensed product pasteurized at 160° F. for ½ hour, although quite satisfactory from a flavor standpoint, does not have as pleasing a taste as a product pasteurized under the same conditions and then concentrated.

The concentrated product can, if desired, be canned and sterilized. In this event, pasteurization is unnecessary.

The deionized high protein milk product can also be homogenized to completely disintegrate the curd particles. Homogenization can be carried out at temperatures from about 100 to about 150° F. and at pressures within the range from 1500 to 5000 p. s. i.

A reconstitutable low salt milk powder can be produced by drying either the finished milk product or, preferably, a product condensed to 30% solids or higher. Both vacuum roll-drying and spray-drying give a satisfactory powder, but the former is coarser and has a slightly higher solubility index. The air temperatures during drying should be controlled in order to avoid damage to the milk solids. In the spray drier, air inlet temperatures should be within the range from 240 to 330° F., and air outlet temperatures within the range from 180 to 220° F. Optimum conditions are an air inlet temperature of 300° F. and an air outlet temperature of 200° F., feeding the milk to the drier at a rate of 3.5 gallons per hour. The product is cooled as quickly as possible after leaving the spray drier to a temperature of 40° F. or below.

A vacuum roll drier gives best results with a 3.6 second drying time, drum steam pressures of 15 to 30 p. s. i. g., a vacuum of 29.5 inches of mercury, and a feed concentration of 30% total solids. Production rate is 8.5 to 12 lbs. of product per hour. The product has a solubility index of 0.5 to 1.0 ml. and contains 2 to 4% moisture.

This powder can be reconstituted by dilution with water to give a milk beverage of any desired solids concentration.

The product can also be dried by a freeze-drying technique at a temperature of 32° F. or below, in vacuo. This procedure is slower than spray drying and more expensive, and therefore less practical from a commercial standpoint, but a product of superior taste properties is obtainable.

The ash content of the product can be adjusted to any desired value by adding salts. Although this can be done any time after deionization, it is however desirable to do it just prior to pasteurization. For example, if a milk of low sodium content is desired, normal amounts of potassium, calcium, phosphate and chloride ions being permissible, potassium, calcium, chloride and phosphate-containing salts, such as potassium dihydrogen phosphate, potassium hydrogen diphosphate, potassium chloride, calcium lactate and calcium chloride, may be added to the milk just prior to pasteurization to bring their concentrations to their normal proportions and while maintaining the pH of the milk in the range from 5.8 to 6.2. In this way a product is obtainable whose sodium content only is reduced, compared to natural milk.

The ash content of the product may be increased above that present in natural milk, in any respect, as desired, by appropriate addition of salts, in order to meet special dietary requirements. By proper choice of salt additions, a dietarily satisfactory ratio of calcium to phosphorus may be maintained and enough potassium may be restored to assure normal protein metabolism.

The following examples are given to further instruct those skilled in the art in the practice of the invention.

EXAMPLE 1

The cream was separated from 60 gallons of raw whole milk at 110° F. The raw skim milk was divided into two parts; 44 gallons was placed in a cheese vat for curd preparation, and the other 16 gallons was passed through approximately 8.5 gallons of a previously prepared mixed bed of Amberlite IRA–400 resin (an anion exchange resin available from the Rohm & Haas Company) and Amberlite IRC–120 resin (a cation exchange resin available from the Rohm & Haas Company). This bed contained 65% of the former resin and 35% of the latter resin. In these proportions, each resin is present in an essentially equivalent capacity basis. The resin-containing column was a glass cylinder eight inches in internal diameter and five feet high, with Tygon-coated black iron conical base and flat top. The resins were retained on a 40 mesh stainless steel screen. A twin column was connected in parallel to the resin-containing column for regeneration of the anion exchange resin.

The skim milk was flowed through the column at a rate of 0.5 gallon per minute throughout the run. The temperature of the effluent milk ranged from 68° F. to 73° F., and its pH from 6.0 to 6.5. The portion of effluent whose conductivity varied from 60 to 340 micromhos was collected. After filtering through a Farmers' filter to remove particles of resin and other foreign matter, the effluent milk (24 gallons) was brought to a pH of 6.6 to 6.8 by addition of 7 oz. of 10% potassium hydroxide solution. The neutralized milk was pasteurized at 160° F. for 30 minutes and then pumped to a vacuum pan and condensed under a vacuum of 27 inches at a temperature of 110° F. to a solids content of approximately 30%. The resulting concentrate was then ready for addition of casein curd and was transferred to a pasteurizing unit for this purpose.

To the 44 gallons of skim milk in the cheese vat there was added approximately 40 ounces of hydrochloric acid (diluted 1:1) with stirring until a pH of 4.5 was reached. At this pH a uniform curd precipitated, and the vat was then drained of the resulting whey. The curd was mixed with 20 gallons of cold water and washed in this way twice to fully remove adhering hydrochloric acid and whey. After the second washing the curd was allowed to drain until completely free of water, and the curd was then ready for incorporation in the deionized milk concentrate.

The deionized skim milk concentrate was heated to 130° F. and ¼ of the curd by volume was added to the concentrate, was mixing. After 5 minutes the pH was adjusted to 6.2 with 10% potassium hydroxide solution. The remainder of the curd was added in 3 portions, each time with adjustment of the pH to 6.2. This required ½ to 1 hour, after which the temperature of the mixture was brought to 160° F. for 30 minutes to pasteurize the product. The mixture then was cooled to 120° F., passed through a homogenizer and homogenized at a pressure of 2500 p. s. i. at the same temperature, and then dried in a Bowen spray drier at a rate of 6 gallons per hour, using an inlet air temperature of 240° F. and an outlet temperature of 180° F. The dried powder was collected and packaged in suitable containers. It was readily reconstitutable with water to produce a deionized high protein milk product of good flavor, useful in supplying high protein to dietary patients who must restrict their intake of sodium.

The mixed bed was then prepared for another batch of skim milk as follows: First it was rinsed with approximately 15 gallons of water and then completely drained. Spent 10% sodium hydroxide solution which had been previously used to regenerate the anion exchange resin was pumped into the bed upflow until the bed was covered. Air was passed upflow into the cone at 5 to 6 p. s. i. in order to break up the resin and then more spent sodium hydroxide solution was pumped in upflow to separate the anion and cation exchange resins. The rate of flow of the spent caustic solution was increased very slowly from 1.5 gal./min./ft.³ to 7 gal./min./ft.³ until all of the anion exchange resin had been washed out at the top of the column. The column was then drained and rinsed with tap water at a downflow rate of 2 to 3 gal./min./ft.³

The anion exchange resin (5.6 gals.) which had been separated from the cation exchange resin was regenerated by treating downflow for 30 minutes with 15 gallons of 10% sodium hydroxide solution and then rinsed downflow for 35 minutes with 33 gallons of water. Spent caustic was collected for reuse. The cation exchange resin (2.6 gals.) which remained in the column was broken up with air agitation for a few minutes and then rinsed downflow with 21 gallons of tap water, partially regenerated by treating for 30 minutes with 15 gallons of spent 5% sulfuric acid solution which had previously been used to regenerate the resin from a previous batch, and then completely regenerated by treating for 30 minutes with 15 gallons of a 5% sulfuric acid solution, and rinsed downflow for 35 minutes with 25 gals. of tap water.

The regenerated resins were then brought together again, covered with water and then intimately mixed by air agitation at 6 to 8 p. s. i. for 10 minutes. The water was drained to the level of the resin in the column and the column was then ready to deionize another portion of milk.

An analysis of a typical dry product prepared as set forth is compared below with a spray-dried skim milk:

Table I

|  | Natural Skim Milk Powder, Percent by Wt. | Deionized High Protein Skim Milk Powder, Percent by Wt. | Percent Difference |
| --- | --- | --- | --- |
| Moisture | 2.0 | 3.75 | +1.75 |
| Protein | 35.60 | 58.00 | +22.40 |
| Lactose H₂O | 52.00 | 31.80 | −20.20 |
| Sodium (by ash) | 0.57 | 0.005 | −0.565 |
| Potassium | 1.60 | 0.33 | −1.27 |
| Calcium | 1.32 | 1.00 | −0.68 |
| Chlorine | 1.10 | 0.02 | −1.08 |
| Phosphate | 2.85 | 1.20 | −1.65 |
| Sulfate | 0.35 | 0.02 | −0.33 |
| Total Ash | 9.0 | 4.5 | −4.5 |

Thus in this product of the invention the carbohydrate content is unchanged compared to natural skim milk, the protein content is 63% higher, and the ash content is only 50% that of natural milk. Over 98% of the sodium, chloride and sulfate and 80% of the potassium present in the skim milk, compared to undeionized natural milk, have been removed. Simultaneously, all ionizable calcium and phosphate ions have been removed. This represents a 25% removal of calcium and 58% removal of phosphate. However, the vitamin content as well as the mineral content is reduced in the powder, compared to the original skim milk, so that the use of vitamin preparations should be continued.

EXAMPLE 2

96.6 pounds of freshly precipitated casein curd, which has previously been pressed to a solids content of about 47%, is wet-milled with water in a sufficient amount to yield a milled casein dispersion of about 15% total solids. 657 pounds of fresh skim milk and the casein slurry are then mixed and stirred to effect complete colloidal suspension of the casein solids in the skim milk, and subsequent to mixing the mixture is pasteurized at 150° F. for 30 minutes.

The pH of the product is adjusted to within the range from 5.8 to 6.2 and the product is then deionized by passage through the mixed bed of cation and anion exchange resins of Example 1, employing the conditions therein set forth and maintaining the pH of the effluent at within the range from 5.8 to 6.2.

This product is concentrated to a solids content of 30% and spray-dried, as set forth in Example 1. The composition of a typical product prepared as set forth is as follows:

*Table II*

| | Percent |
|---|---|
| Protein | 59.6 |
| Moisture | 4.0 |
| Lactose (milk sugar) | 30.2 |
| Ash | 2.5 |
| Calcium | 0.38 |
| Phosphorus | 0.42 |
| Sodium | 0.01 |

EXAMPLE 3

A palatable whole milk drink is prepared by mixing 6 level tablespoons (22.5 grams) of the powder produced in Example 1 or 2 with 4 level teaspoons (20 grams) of heavy cream in enough water to make one cup of final volume. Thirteen cupfulls of this beverage contain twenty-six times the amount of protein and less sodium than one cup of regular whole milk, and its taste is much like that of fresh whole milk except for a flatness due to its low salt content.

A palatable beverage may be prepared by mixing 12 level tablespoons (45 grams) of the powder in enough water to give one cup of final volume. Twenty-five cups of this contain fifty times the amount of protein and less sodium than one cup of regular whole milk.

A skim milk type beverage may be prepared by mixing 6 level tablespoons (22.5 grams) of the powder in enough water to give one cup of final volume. Fifty cupfuls contain one hundred times the amount of protein and less sodium than one cup of regular skim milk.

The dry powder is also useful in preparing cocoa, as substitute for fresh milk or cream upon cereal, and in coffee.

The following table compares with skim milk and whole milk the mineral, protein and calorie content of one glass (8 ounces) of this powder reconstituted with water and/or cream as set forth above:

The deionized high protein milk produced in accordance with the invention is useful wherever there is required a substantially or largely salt-free product containing a large proportion of protein as well as other non-salt solids. The effluent milk product is somewhat sweeter in taste than natural milk, but acquires substantially no flavor from the resins with which it is placed in contact. Therefore, the product of the invention is particularly adapted to meet special dietary needs, either in liquid form, or sterilized and condensed, or dried to form a deionized high protein milk powder capable of being rapidly reconstituted by addition of water, milk or cream to form a liquid milk product.

Various changes and modifications may be made in the invention, as will be apparent to those skilled in the art, and the invention is not to be limited except as set forth in the following claims.

All parts and percentages in the specification and claims are by weight, unless otherwise indicated.

We claim:

1. A process of preparing a deionized high protein milk which comprises treating the milk with a mixture comprising 1 part of an anion exchange resin and from 0.8 to 1.33 parts of a strongly acidic cation exchange resin, said parts being determined on an ion exchange capacity basis, the proportions of said resins being selected within the stated ranges to maintain the pH of the effluent milk at within the range from 5.0 to 7.0, adjusting the solids content of the milk to at least 30% and the pH of the milk to within the range from 5.8 to 6.2 and incorporating protein in the milk.

2. A process in accordance with claim 1 which includes pasteurizing the milk prior to incorporation of protein.

3. A process in accordance with claim 1 in which the milk is treated with a mixture of ion exchange resins after the protein has been incorporated in the milk.

4. A process in accordance with claim 3 which includes pasteurizing the milk containing added protein and then treating the milk with the ion exchange resins.

5. A process in accordance with claim 1 in which the anion exchange resin is of the quaternary ammonium type and the cation exchange resin is of the nuclear sulfonic acid type.

6. A process in accordance with claim 1 in which the anion exchange resin is of the amine type and the cation exchange resin is of the nuclear sulfonic acid type.

7. A process of preparing a deionized high protein milk which comprises dispersing milk protein in milk, pasteurizing the high protein milk and then treating the high protein milk with a mixture comprising 1 part of an anion exchange resin and from 0.8 to 1.33 parts of a strongly acidic cation exchange resin, said parts being determined on an ion exchange capacity basis, the proportions of said resins being selected within the stated ranges to maintain the pH of the effluent milk at within the range from 5.8 to 6.2.

8. A process in accordance with claim 7 in which the anion exchange resin is of the quaternary ammonium type and the cation exchange resin is of the nuclear sulfonic acid type.

*Table III*

| Preparation | Fat | Calories | Protein (grams) | Ca (mg.) | PO4 (mg.) | Na (mg.) | K (mg.) |
|---|---|---|---|---|---|---|---|
| High Protein Low Salt Milk as Beverage (20% Total solids) | 0.1 | 184 | 27 | 475 | 558 | 3 | 155 |
| High Protein Low Salt Milk as Skim Milk (10% Total solids) | 0.05 | 92 | 13.5 | 237 | 280 | 1.5 | 78 |
| High Protein Low Salt Milk with Cream (13.5% Total solids) | 3.25 | 168 | 14.3 | 265 | 330 | 6 | 128 |
| Skim Milk (9.3% Total solids) | 0.1 | 84 | 8.4 | 312 | 675 | 139 | 380 |
| Whole Milk (13.2% Total solids) | 4.0 | 168 | 8.64 | 286 | 656 | 131 | 365 |

9. A process in accordance with claim 7 in which the anion exchange resin is of the amine type and the cation exchange resin is of the nuclear sulfonic acid type.

10. A process of preparing a deionized high casein milk which comprises dispersing a casein curd in skim milk, pasteurizing the milk and then treating the milk with a mixture comprising 1 part of an anion exchange resin and from 0.8 to 1.33 parts of a strongly acidic cation exchange resin, said parts being determined on an ion exchange capacity basis, the proportions of said resins being selected within the stated ranges to maintain the pH of the effluent milk at within the range from 5.0 to 7.0.

11. A process in accordance with claim 10 in which the casein curd is acid-precipitated casein.

12. A process in accordance with claim 10 in which the casein curd is rennet-precipitated casein.

13. A process of preparing a deionized high casein milk which comprises treating the milk with a mixture comprising 1 part of an anion exchange resin and from 0.8 to 1.33 parts of a strongly acidic cation exchange resin, said parts being determined on an ion exchange capacity basis, the proportions of said resins being selected within the stated ranges to maintain the pH of the effluent milk at within the range from 5.0 to 7.0, adjusting the pH of the milk to within the range from 6.8 to 7.0, concentrating the milk to a solids content of at least 30%, adjusting the pH of the milk to within the range from 5.8 to 6.2, and then dispersing a casein curd in the deionized concentrate while holding the pH within the said range of 5.8 to 6.2.

14. A process of preparing a deionized high protein milk which comprises adjusting the pH of a deionized milk to within the range from 5.8 to 6.2, and then incorporating protein therein while holding the pH within the said range.

15. A process in accordance with claim 14 in which the protein is a casein curd.

16. A process in accordance with claim 14 which includes adjusting the solids content to at least 30% and heating the deionized milk at a temperature within the range from 120 to 130° F. while incorporating the protein therein.

17. A process in accordance with claim 14 which includes pasteurizing the deionized high protein milk.

18. A process in accordance with claim 14 which includes drying the deionized high protein milk.

19. A process of preparing a deionized high protein milk which comprises the steps of treating the milk with a mixture comprising 1 part of an anion exchange resin and from 0.8 to 1.33 parts of a strongly acidic cation exchange resin, said parts being determined on an ion exchange capacity basis, the proportions of said resins being selected within the stated ranges to maintain the pH of the effluent at within the range from 5.0 to 7.0, and of incorporating protein in the milk.

20. A process in accordance with claim 19 which includes the step of pasteurizing the deionized high protein milk.

21. A process in accordance with claim 19 which includes the step of homogenizing the deionized high protein milk.

22. A process in accordance with claim 19 which includes the steps of concentrating the milk and of drying the concentrated deionized high protein milk.

23. A deionized high protein natural fluid milk in the form of a stable liquid dispersion having a pH within the range of 5.8 to 6.2 and a total ash content less than 40% that of the ash content of the original natural fluid milk before deionization, the sodium, potassium, chloride and sulfate ion contents having been deionized to the extent of at least about 80% and the calcium and phosphate ion contents having been deionized to the extent of at least about 45% compared to the corresponding ion contents of the original nondeionized natural fluid milk, said milk having a higher protein content than the original natural fluid milk before deionization and a substantially undiminished carbohydrate content.

24. A deionized high protein natural milk in accordance with claim 23 whose sodium, potassium, chloride and sulfate ion contents have been deionized to the extent of at least 98% compared to the corresponding ion contents of the original nondeionized natural fluid milk.

25. A deionized reconstitutable high protein natural milk powder having, when reconstituted with water, a pH within the range of 5.8 to 6.2 and having a total ash content less than 40% that of the ash content of the original natural fluid milk before deionization, the sodium, potassium, chloride and sulfate ion contents having been deionized to the extent of at least about 80% and the calcium and phosphate ion contents having been deionized to the extent of at least about 45% compared to the corresponding ion contents of the original nondeionized natural fluid milk, said milk having a higher protein content than the original natural fluid milk before deionization and a substantially undiminished carbohydrate content.

26. A deionized concentrated high protein natural fluid milk having a solids content of at least 10%, a pH within the range of 5.8 to 6.2 and a total ash content less than 40% that of the ash content of the original natural fluid milk before deionization, the sodium, potassium, chloride and sulfate ion contents having been deionized to the extent of at least about 80% and the calcium and phosphate ion contents having been deionized to the extent of at least about 45% compared to the corresponding ion contents of the original nondeionized natural fluid milk, said milk having a higher protein content than the original natural fluid milk before deionization and a substantially undiminished carbohydrate content.

27. A sterilized deionized high protein natural fluid milk having a pH within the range of 5.8 to 6.2 and a total ash content less than 40% that of the ash content of the original natural fluid milk before deionization, the sodium, potassium, chloride and sulfate ion contents having been deionized to the extent of at least about 80% and the calcium and phosphate ion contents having been deionized to the extent of at least about 45% compared to the corresponding ion contents of the original nondeionized natural fluid milk, said milk having a higher protein content than the original natural fluid milk before deionization and a substantially undiminished carbohydrate content.

28. A deionized high protein natural fluid milk in the form of a stable liquid dispersion having a pH within the range of 5.8 to 6.2, whose sodium ion content is not in excess of about 2% of the corresponding sodium ion content of the original nondeionized natural fluid milk, whose potassium, calcium, chloride, sulfate and phosphate ion and carbohydrate contents are substantially undiminished, compared to the corresponding contents of the original nondeionized natural fluid milk, and whose protein content is higher than that of the original nondeionized natural fluid milk before deionization.

29. A deionized high protein natural whole fluid milk in the form of a stable liquid dispersion having a pH within the range of 5.8 to 6.2 and a total ash content less than 40% that of the ash content of the original natural fluid milk before deionization, the sodium, potassium, chloride and sulfate ion contents having been deionized to the extent of at least about 80% and the calcium and phosphate ion contents having been deionized to the extent of at least about 45% compared to the corresponding ion contents of the original nondeionized natural fluid milk, said milk having a higher protein content than the original natural fluid milk before deionization and a substantially undiminished carbohydrate content.

30. A deionized high protein natural fluid skimmilk in the form of a stable liquid dispersion having a pH within the range of 5.8 to 6.2 and a total ash content less than 40% that of the ash content of the original natural fluid skimmilk before deionization, the sodium, potassium, chloride and sulfate ion contents having been deionized to the extent of at least about 80% and the calcium and phosphate ion contents having been deionized to the extent of at least about 45% compared to the corresponding ion contents of the original nondeionized natural fluid skimmilk, said skimmilk having a higher protein content than the original natural fluid skimmilk before deionization and a substantially undiminished carbohydrate content.

31. A process in accordance with claim 14 which includes adding to the deionized milk an amount of at least one ion selected from the group consisting of potassium, sodium, calcium, chloride, sulfate and phosphate ions removed in the deionization, to increase the concentration thereof in the deionized milk.

32. A process in accordance with claim 31 which includes restoring to the normal value the concentration in the deionized milk of at least one of said ions removed in the deionization.

33. A process in accordance with claim 31 which includes restoring to the normal value the concentration in the deionized milk of all of said ions removed in the deionization except sodium.

34. A process of preparing a deionized high protein skimmilk which comprises adjusting the pH of the deionized skimmilk to within the range to 5.8 to 6.2 and then incorporating milk protein therein while holding the pH within the said range.

35. A process of preparing a deionized high protein whole milk which comprises adjusting the pH of a deionized whole milk to within the range of 5.8 to 6.2 and then incorporating milk protein therein while holding the pH within the said range.

36. A process of preparing a deionized high protein sterilized milk which comprises adjusting the pH of the deionized sterilized milk to within the range from 5.8 to 6.2 and then incorporating milk protein therein while holding the pH within the said range.

37. A process of preparing a deionized high protein concentrated milk having a solids content of at least 10% which comprises adjusting the pH of a deionized concentrated milk having a solids content of at least 10% to within the range from 5.8 to 6.2 and then incorporating milk protein therein while holding the pH within the said range.

References Cited in the file of this patent

UNITED STATES PATENTS

| | | |
|---|---|---|
| 2,102,642 | Otting et al. | Dec. 21, 1937 |
| 2,465,906 | Meade et al. | Mar. 29, 1949 |
| 2,503,866 | Chrysler et al. | Apr. 11, 1950 |
| 2,511,825 | Myers | June 13, 1950 |
| 2,541,568 | Baur et al. | Feb. 13, 1951 |

OTHER REFERENCES

Tiger, H. L. and Sussman, S. "Demineralizing Solutions by a Tyo Step Ion Exchange Process," Industrial Engineering Chemistry, February 1943, pages 186 to 191.

"Readjustment of Salts in Milk by Base Exchange Treatment," by J. F. Lyman et al., pages 1 to 5, page 4 only reprinted from Industrial and Eng. Chemistry, vol. 25, page 1297, November 1933.